United States Patent
Grabau

(10) Patent No.: US 6,634,560 B1
(45) Date of Patent: Oct. 21, 2003

(54) RADIO FREQUENCY IDENTIFICATION TAGGING, ENCODING/READING THROUGH A DIGITIZER TABLET

(75) Inventor: Robert E. Grabau, Tonawanda, NY (US)

(73) Assignee: Moore North America, Inc., Grand Island, NY (US)

( * ) Notice: Subject to any disclaimer, the term of this patent is extended or adjusted under 35 U.S.C. 154(b) by 0 days.

(21) Appl. No.: 09/460,572

(22) Filed: Dec. 14, 1999

(51) Int. Cl.[7] .............................................. G06K 19/06
(52) U.S. Cl. .................................. 235/492; 235/472.01
(58) Field of Search ............................... 235/492, 375, 235/379, 380, 472.01–472.02; 340/10.1, 10.4, 41, 42; 705/3, 4, 35, 38, 39

(56) References Cited

U.S. PATENT DOCUMENTS

| | | | |
|---|---|---|---|
| 4,902,858 A | | 2/1990 | Yamanami et al. ............ 178/19 |
| 5,107,541 A | * | 4/1992 | Hilton ............................ 382/3 |
| 5,278,399 A | * | 1/1994 | Sano ....................... 235/462.45 |
| 5,294,792 A | * | 3/1994 | Lewis et al. ................. 250/221 |
| 5,297,202 A | * | 3/1994 | Kapp et al. ..................... 380/9 |
| 5,528,222 A | * | 6/1996 | Moskowitz et al. ......... 340/572 |
| 5,541,399 A | * | 7/1996 | De Vall ....................... 235/491 |
| 5,554,827 A | * | 9/1996 | Oda ............................. 178/18 |
| 5,629,499 A | * | 5/1997 | Flickinger et al. ............. 178/18 |
| 5,734,129 A | * | 3/1998 | Belville et al. ................ 178/18 |
| 5,748,779 A | * | 5/1998 | Sakaguchi ................... 382/203 |
| 6,147,662 A | * | 11/2000 | Grabau et al. ............... 343/894 |
| 6,206,292 B1 | * | 3/2001 | Robertz et al. ............... 235/488 |
| 6,215,401 B1 | * | 4/2001 | Brady et al. .............. 340/572.7 |
| 6,222,452 B1 | * | 4/2001 | Ahlstrom et al. ......... 340/572.1 |

FOREIGN PATENT DOCUMENTS

| | | | |
|---|---|---|---|
| DE | 19601358 A | | 7/1996 |
| JP | 01-142819 | * | 6/1989 |

* cited by examiner

*Primary Examiner*—Diane I. Lee
(74) *Attorney, Agent, or Firm*—Simpson & Simpson, PLLC

(57) ABSTRACT

A communication device including a digitizer pad and a substrate including a radio frequency tag, where the tag and the digitizer pad are operatively arranged to communicate with each other. A method of communication between a radio frequency identification tag, preferably secured to a business form, and a digitizing tablet.

18 Claims, 5 Drawing Sheets

RADIO FREQUENCY IDENTIFICATION TAGGING, ENCODING/READING THROUGH A DIGITIZER TABLET

FIELD OF THE INVENTION

This invention relates generally to radio frequency identification tagging (RFID) and digitizing tablets and, more particularly, to a combination RFID/digitizing tablet.

BACKGROUND OF THE INVENTION

Radio frequency identification tagging is a known method of identification. An information carrying device, or tag, functions in response to a coded radio frequency (RF) signal transmitted from a base station. The RF carrier signal reflects from the tag and can be demodulated to recover information stored in the tag. The tag typically includes a semiconductor chip having RF circuits, logic, and memory, as well as an antenna. Various tag structures, circuits, and programming protocols are known in the art. Examples are described in U.S. Pat. No. 5,682,143 (Brady et al.) and 5,444,223 (Blama), both of which are incorporated herein by reference.

Although RFID tags are not yet as prevalent as other identification means (e.g., barcode) due to the cost of tags and their relative bulkiness, RFID tags are gaining in popularity in various applications. These include railway boxcar and tractor trailer identification schemes, fare cards for buses and subways, animal identification, employee and security badges, and in automatic highway toll systems. In an automatic highway toll system in place for the New York State Thruway, for example (EZ Pass), drivers mount an RFID tag on the front vehicle windshield. The tag is preprogrammed with driver information, such as account status, vehicle information, etc. As the vehicle passes through a toll, a base transmitter at the tollbooth emits a signal which is reflected by the RFID tag. If the driver's account is satisfactory, a green light activates; indicating the driver is free to pass through the toll.

Digitizer tablets (also known as digitizer pads or digital pads) are also well known in the art. A digitizer tablet is a computer-input device which captures an analog image impressed upon a surface of the tablet and converts the image into a digital representation thereof. A typical digitizer tablet includes a pressure sensitive element and a pen-like writing stylus. The electronic pressure sensitive elements senses the position of the stylus on the tablet and reports it (perhaps 100 times per second or more) to a computer. Digitizing tablets are used in computer aided drafting (CAD) applications, to record signature images in electronic commerce, and in certain biometrics signature verification schemes (a method of verifying the signer's identity by assessing indicators such as line shape and stylus pressure). Digitizing tablets are also used as input devices for computer games, keyboards, graphics display inputs and the like.

Digitizing tablets capable of sensing two-dimensional spatial parameters are well known in the art. More recently, tablets capable of sensing three-dimensional parameters (e.g., two spatial parameters plus pressure of the stylus) have been developed. An example of such a three dimensional digitizing tablet is disclosed in U.S. Pat. No. 4,810,992 (Eventoff), incorporated herein by reference.

Although both RFID and digitizing tablets have both been known in the art, heretofore, apparently no one has combined an RFID with a digitizing tablet. There has existed a longfelt need for such a device, with many applications in business.

SUMMARY OF THE INVENTION

The invention broadly comprises a communication device including a digitizer pad and a substrate including a radio frequency tag, where the tag and the digitizer pad are operatively arranged to communicate with each other. The invention also includes a method of communication between a radio frequency identification tag, preferably secured to a business form, and a digitizing tablet.

A general object of the invention is to provide a communication link between a digitizing pad and a radio frequency identification tag.

Another object is to provide a business form containing a radio frequency identification tag in combination with a digitizing tablet operatively arranged to communicate with the radio frequency identification tag.

A further object is to provide a means and method for communicating useful information about a business form to a digitizing tablet prior to, or concurrently with, the form being placed upon the tablet for communication via the tablet stylus.

These and other objects, features and advantages of the present invention will become readily apparent to those having ordinary skill in the art in view of the following detailed description in view of the several drawing figures and appended claims.

DETAILED DESCRIPTION OF THE PREFERRED EMBODIMENT

Figure 1:
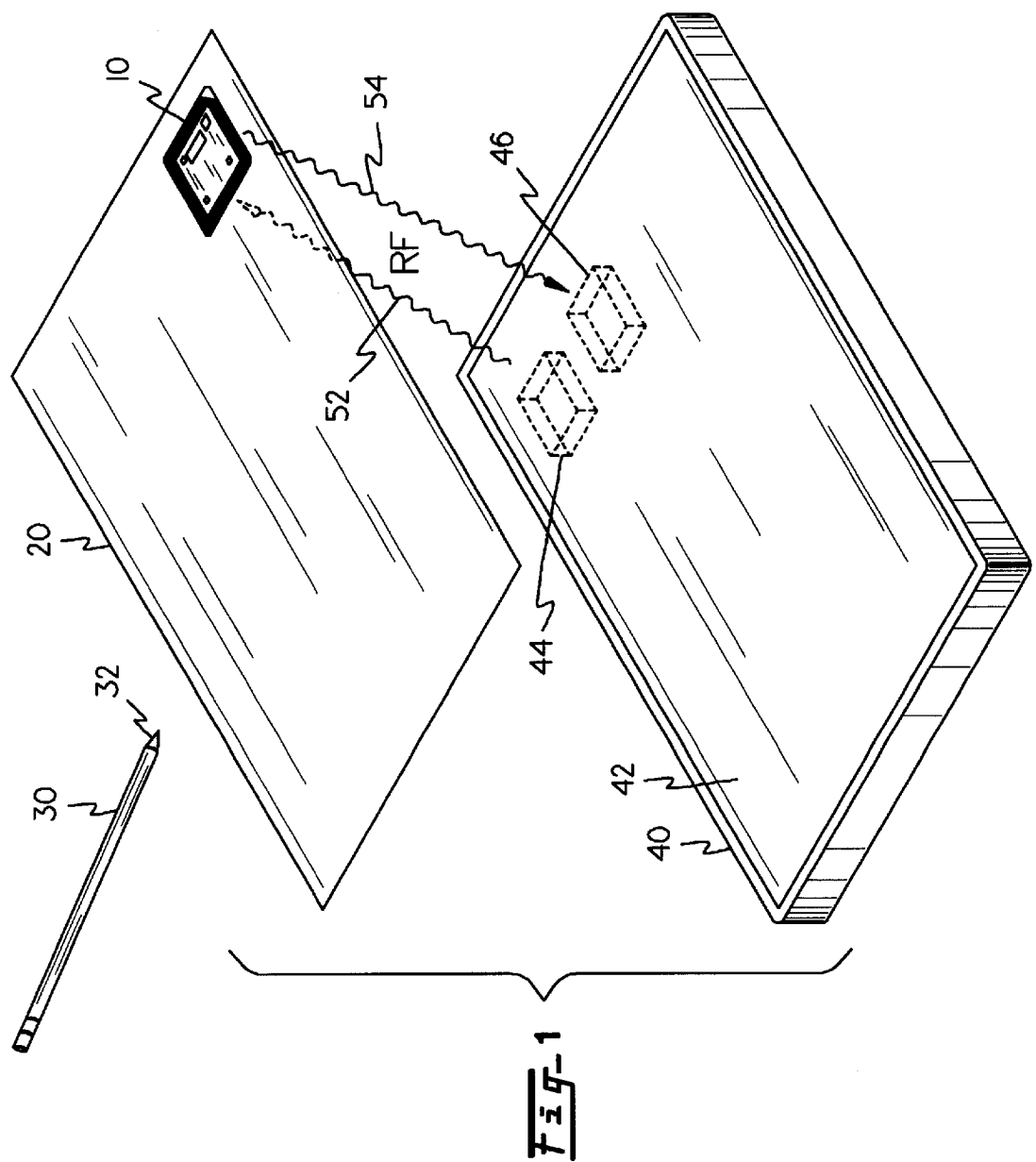
FIG. 1 is an exploded perspective elevational view of the invention, showing the radio frequency identification tag (RFID) attached to a substrate, the digitizing tablet, and the stylus.

At the outset, it should be clearly understood that like reference numerals are intended to identify the same structural elements, portions or surfaces consistently throughout the several drawing figures. as such elements, portions or surfaces may be further described or explained by the entire written specification, of which this detailed description is an integral part. Unless otherwise indicated, the drawings are intended to be read together with the specification, and are to be considered a portion of the entire "written description" of this invention.

FIG. 1 is an exploded perspective elevational view of the invention. The invention broadly comprises digitizing tablet 40 in combination with substrate 20, which substrate includes radio frequency identification tag (RFID) 10. The digitizer includes a pressure sensitive top surface 42. Stylus 30 having stylus tip 32 can be used to communicate input signals to surface 42. The substrate can be manufactured from a variety of different materials, such as paper, plastic and the like. The nature of the material and general structure of the substrate is immaterial to the present invention. The substrate could, for example, comprise a single sheet of paper. It could comprise a business form, either single ply, or multi-ply. It may be a carbonless form, or be a multi-part form having sections separable and detachable.

RFID 10 is secured to substrate 20. In the embodiment shown in FIGS. 1–4, the RFID is surface-mounted to the substrate. Once again, it is immaterial to the invention as to how, or even where, the RFID is secured or attached to the substrate. Any means of attachment known to those having ordinary skill in the art may be used. In the embodiment shown, the RFID is positioned in the top right-hand portion of the substrate, although it could be positioned at another location. In practice, the RFID placement on the substrate is dictated by the design and function of the substrate itself. For example, the RFID (if surface mounted) might be placed as to avoid printed indicia on a business form. This would not be necessary if the RFID was embedded within the substrate, as in an alternative embodiment described infra.

The RFID itself may comprise a number of forms. For example, both of the radio frequency identification tags described in the aforementioned U.S. Pat. Nos. 5,444,223 and 5,682,143 would be suitable for the present invention, although other RFID devices would also be suitable.

In some RFIDs, for example, the device is passive and merely reflects the transmitted signal back to the source. The incoming signal is processed by a semiconductor/logic circuit within the RFID, and causes impedance changes which then modulates the RF signal. This modulation allows the tag to send useful information back to the base station. In other RFID designs, the device may include an internal power supply, and/or its own transmitter and receiver units.

As shown in FIG. 1, as the substrate approaches the digitizing tablet, transmitter 44 in the tablet sends a radio frequency (RF) signal 52 which is received by the RFID. The RFID then transmits signal 54 back to receiver 46 in the tablet, which signal contains certain information about the substrate. (In practice, the RFID may be a passive device, and merely reflect the original signal back to the transmitter/receiver of the digitizing tablet, where the reflected signal has been modified in some way to convey information back to the digitizing tablet. Also, the transmitter/receiver in the tablet may be embodied in an integral unit.) For example, the information can include a unique identifier for the substrate, an operator number, a location code, an inventory control code, etc. It is not necessary that the substrate be actually placed on the digitizing tablet for the communication to begin, although the maximum distance between the tablet and RFID for effective communication is largely determined by signal strength and antenna design.

Figure 2:
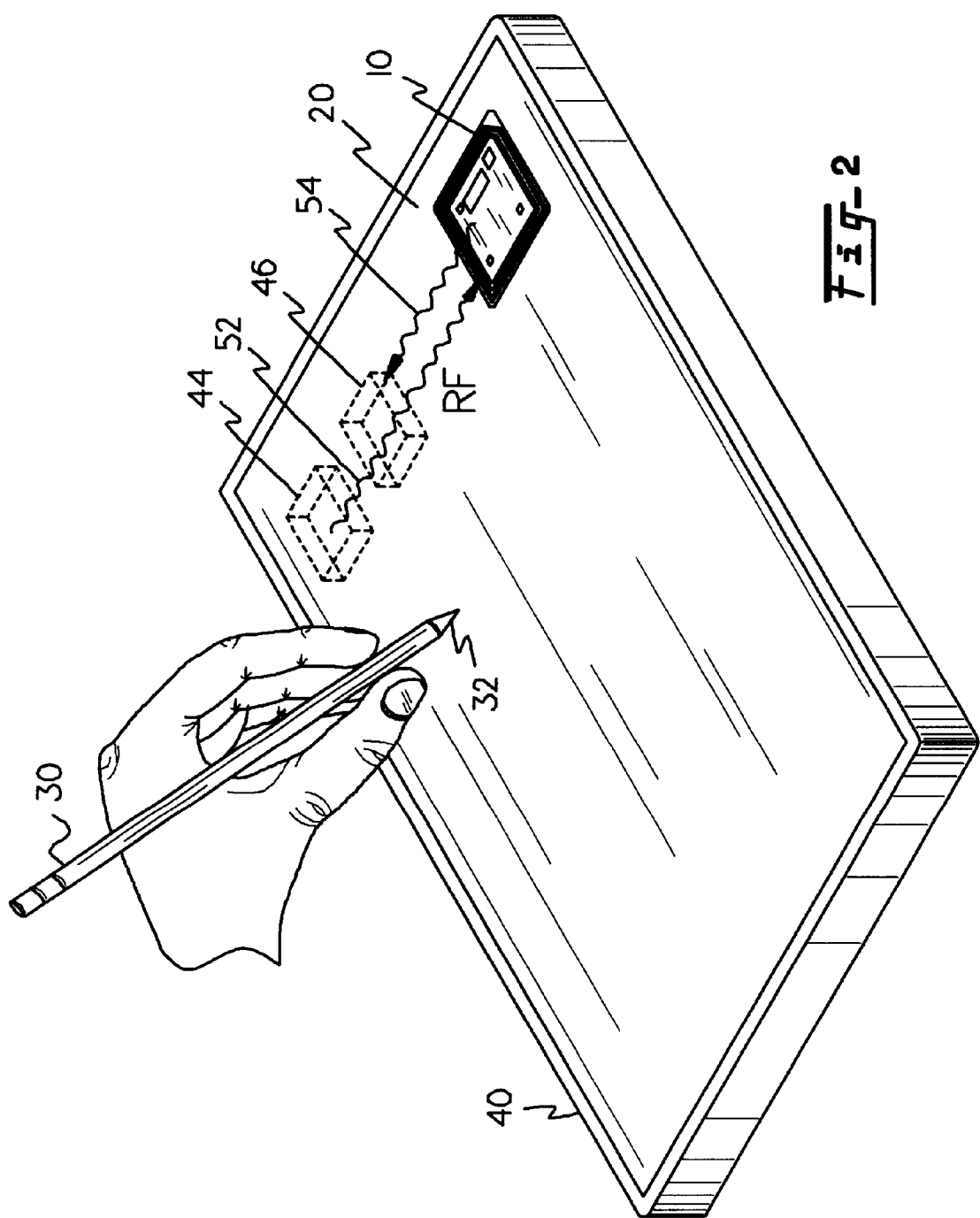
FIG. 2 is a perspective view of the invention, illustrating the RFID tag attached to a substrate, with the substrate in place on the digitizing tablet.
Figure 3:
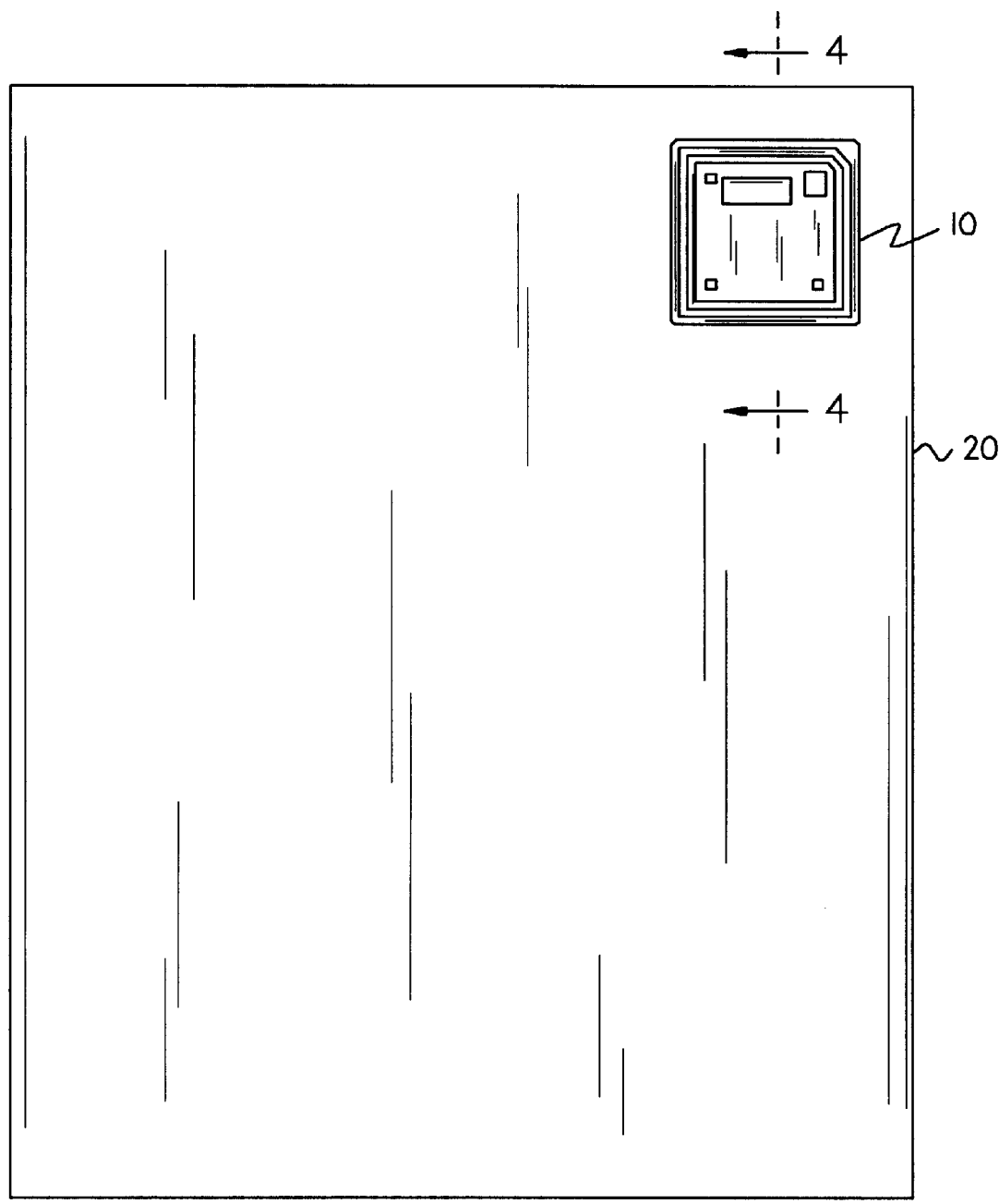
FIG. 3 is a plan view of the substrate containing the RFID shown in FIGS. 1 and 2.
Figure 4:
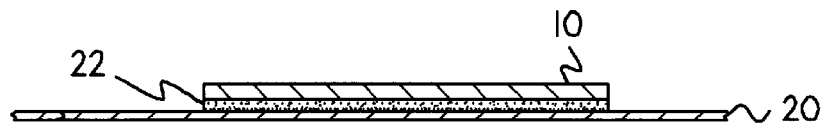
FIG. 4 is an enlarged partial cross-sectional view of the substrate and RFID, taken generally along lines 4—4 of FIG. 3.
Figure 6:
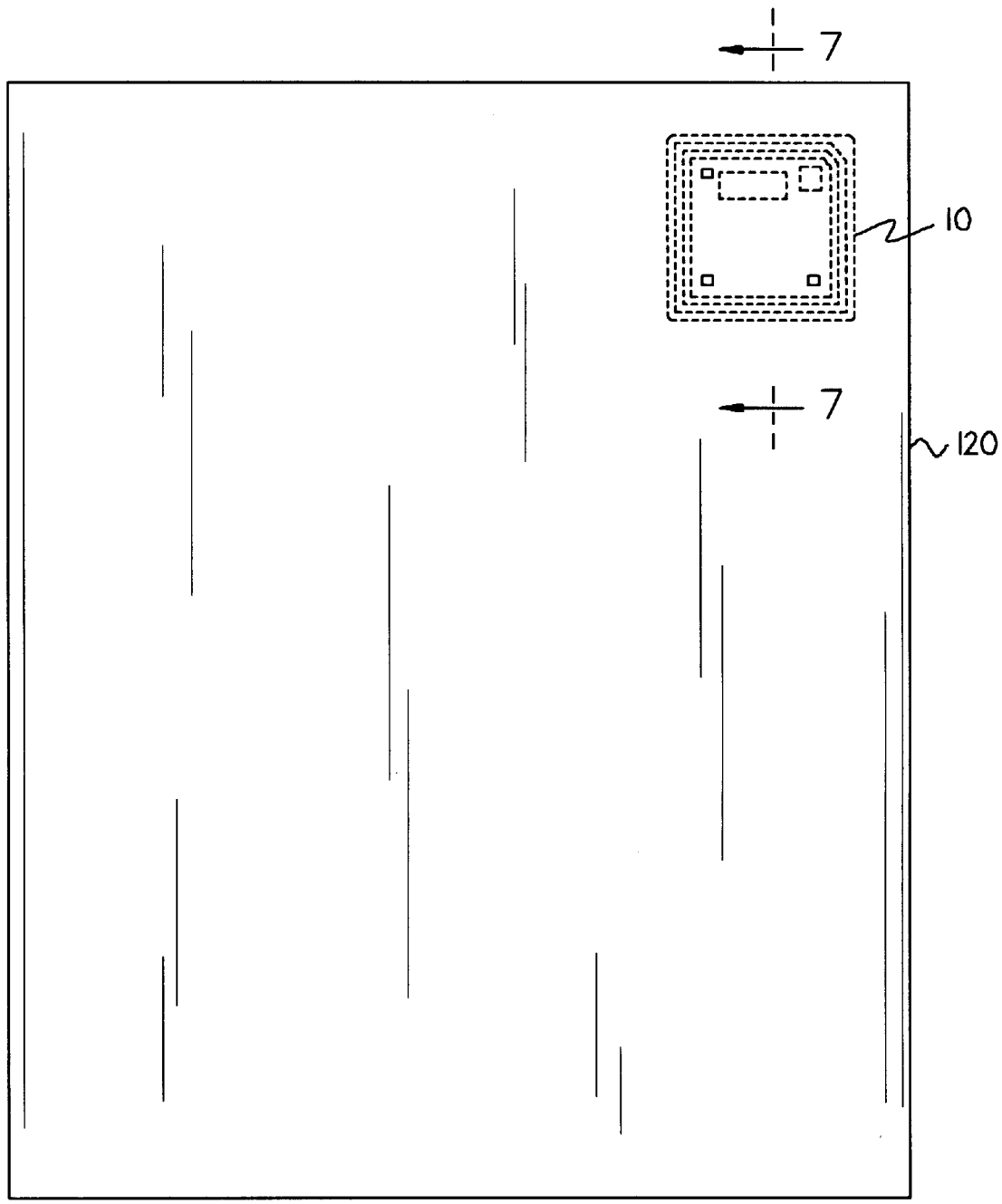
FIG. 6 is a plan view of an alternative embodiment of the substrate of the invention; and, FIG. 7 is a partial cross-sectional view of the substrate and RFID, taken generally along lines 7—7 of FIG. 6.
Figure 7:

As shown in FIG. 2, once the substrate is positioned atop the digitizing tablet, the stylus 30 can be used to further transmit information through the substrate to the pressure sensitive surface of the tablet. The point 32 of the stylus sends signals through the pressure sensitive layer to a processor. The substrate is shown in plan view in FIG. 3. Again, although this view shows the RFID placed in the top right-hand section of the substrate, this position is not critical. It could be placed elsewhere on the substrate. Also, as shown in FIG. 4, which is a partial cross-sectional view of the substrate and RFID taken generally along lines 4—4 of FIG. 3, RFID 10 is surface mounted atop surface 22 of substrate 20. An alternative embodiment is shown in FIGS. 6 and 7. In this embodiment, as shown in FIG. 6, the RFID is still placed in the top right-hand section of the substrate but, as shown in the cross-sectional view of FIG. 7 (taken generally along lines 7—7 of FIG. 6, RFID is embedded within substrate 120. The embedding can be accomplished in a number of ways known in the art. For example, the RFID could be secured to the substrate by perforations or die-cuts, or secured between plies of a multi-ply substrate.

Figure 5:
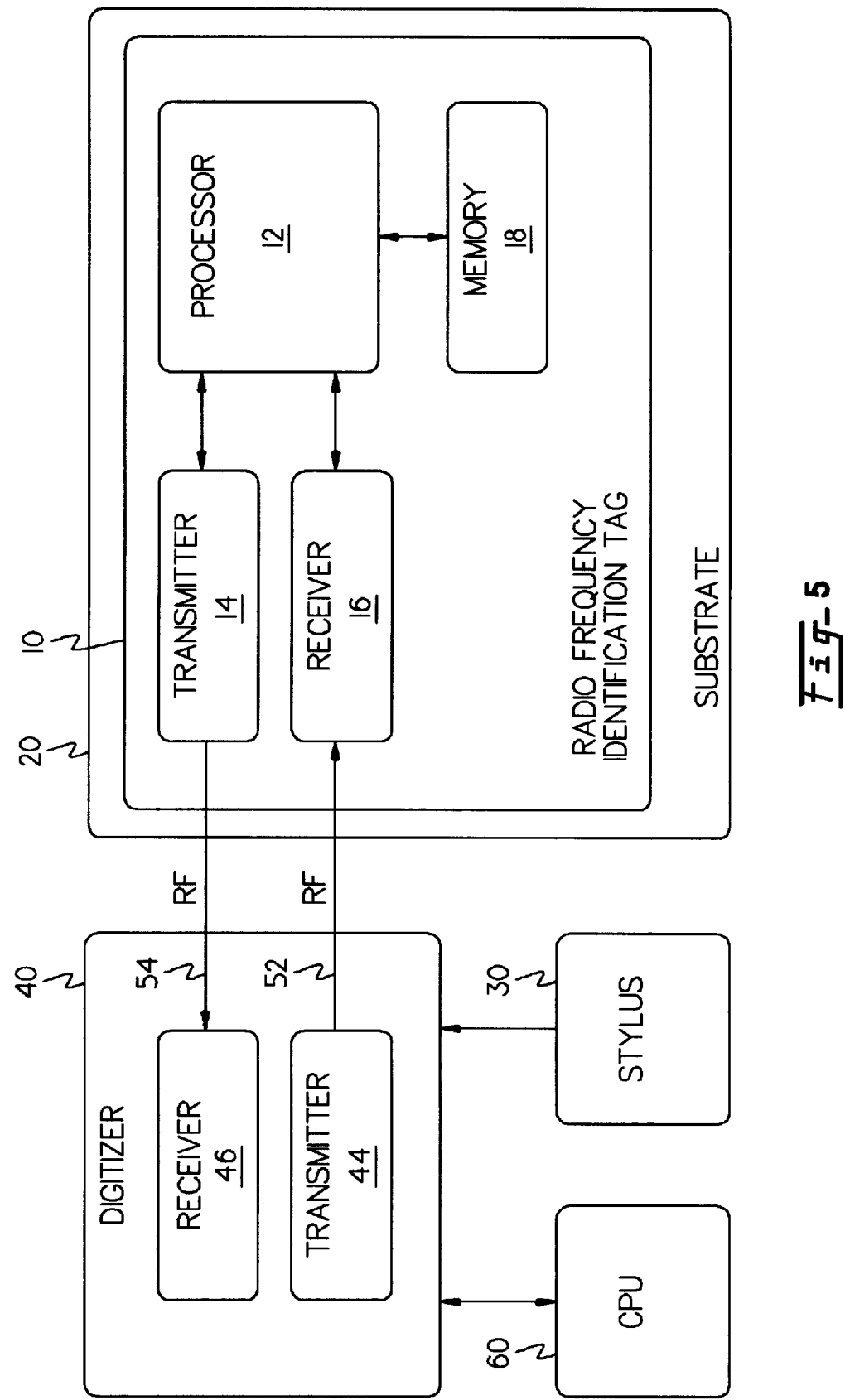
FIG. 5 is a block diagram of the electronic and radio frequency circuit of the invention.

FIG. 5 illustrates a block diagram of the communication paths of the invention. RFID 10 is shown to comprise transmitter 14, receiver 16, processor 12, and memory 18. Digitizing tablet 40 comprises transmitter 44 and receiver 46, which communicate with RFID receiver 16 and transmitter 14, respectively, via radio frequency signals. Stylus 30 also communicates with digitizer 40, which signals are communicated to remote processor 60. Again, this block diagram is representative of but one of many different possible circuit embodiments of the invention. The RFID, for example, may not include an internal memory. It may include a separate power supply, or none at all. It may have a single antenna used both for reception and reflection of the RF signal.

Thus, it is seen that the objects of the invention are efficiently obtained, although changes and modifications to the invention may be made without departing from the scope and spirit of the invention as described in the appended claims.

What is claimed is:

1. A communication device, comprising:
   a digitizer tablet comprising communication means and a pressure sensitive top surface; and
   a substrate comprising a business form and a radio frequency identification tag, wherein said substrate and said digitizer tablet are operatively arranged for communication.

2. A communication device as recited in claim 1, wherein said substrate is made of paper.

3. A communication device as recited in claim 1 wherein said radio frequency identification tag is mounted atop a surface of said substrate.

4. A communication device as recited in claim 1 wherein said radio frequency identification tag is integral with said substrate.

5. A communication device as recited in claim 1 wherein said radio frequency identification tag is flush mounted to said substrate.

6. A communication device as recited in claim 1 wherein said digitizer tablet includes a radio frequency transmitter operatively arranged to transmit a radio frequency signal to said radio frequency identification tag.

7. A communication device as recited in claim 1 wherein said digitizer tablet includes a radio frequency receiver operatively arranged to receive a radio frequency signal reflected from said radio frequency identification tag.

8. A communication device as recited in claim 1 wherein said digitizer tablet includes a radio frequency receiver operatively arranged to receive a radio frequency signal transmitted from said radio frequency identification tag.

9. A communication device, comprising:
   a digitizer tablet comprising communication means and a pressure sensitive top surface; and
   a substrate comprising a business form and a radio frequency identification tag, wherein said substrate and said digitizer tablet are operatively arranged for communication and said radio frequency identification tag is programmed with information relative to said business form.

10. A method of communication, comprising:
   transmitting a radio frequency signal from a transmitter in a digitizer tablet having a pressure sensitive top surface;
   reflecting said radio frequency signal from a radio frequency identification tag,
   where said radio frequency tag modulates said radio frequency signal to include information; and
   receiving said radio frequency signal by a receiver in said digitizer tablet.

11. A method of communication as recited in claim 10 wherein said radio identification tag is secured to a substrate.

12. A method of communication as recited in claim 11 wherein said substrate comprises a business form.

13. A method of communication as recited in claim 10 further comprising the step of demodulating said radio frequency signal.

14. A method of communication, comprising:
   transmitting a first radio frequency signal from a transmitter in a digitizer tablet having a pressure sensitive top surface;
   receiving said first radio frequency signal by a radio frequency identification tag;
   transmitting a second radio frequency signal by said radio frequency identification tag in reply to the reception of the first radio frequency signal; and
   receiving said second radio frequency signal by a receiver in said digitizer tablet.

15. A method of communication as recited in claim 14 wherein said radio identification tag is secured to a substrate.

16. A method of communication as recited in claim 15 wherein said substrate comprises a business form.

17. A method of communication as recited in claim 14 further comprising the step of demodulating said radio frequency signal.

18. A communication device, comprising:
   a digitizer tablet comprising communication means and a pressure sensitive top surface; and
   a paper substrate comprising a radio frequency identification tag, wherein said substrate and said digitizer tablet are operatively arranged for communication.

* * * * *